United States Patent
Kao

(10) Patent No.: US 10,818,124 B2
(45) Date of Patent: Oct. 27, 2020

(54) AUTOMATED PROCESSING SYSTEM FOR MAKING BEVERAGE

(71) Applicant: Sheng-Shing Kao, New Taipei (TW)

(72) Inventor: Sheng-Shing Kao, New Taipei (TW)

(73) Assignee: Sheng-Shing Kao, New Taipei (TW)

( * ) Notice: Subject to any disclaimer, the term of this patent is extended or adjusted under 35 U.S.C. 154(b) by 122 days.

(21) Appl. No.: 16/223,197

(22) Filed: Dec. 18, 2018

(65) Prior Publication Data
US 2020/0193760 A1 Jun. 18, 2020

(51) Int. Cl.
| | | |
|---|---|---|
| *G07F 13/06* | (2006.01) | |
| *G07F 13/10* | (2006.01) | |
| *A23L 2/52* | (2006.01) | |
| *G06Q 30/06* | (2012.01) | |
| *G06Q 20/18* | (2012.01) | |
| *A47J 31/44* | (2006.01) | |
| *G07F 9/00* | (2006.01) | |

(52) U.S. Cl.
CPC ............... *G07F 13/10* (2013.01); *A23L 2/52* (2013.01); *G06Q 20/18* (2013.01); *G06Q 30/06* (2013.01); *G07F 13/06* (2013.01); *G07F 13/065* (2013.01); *A47J 31/4403* (2013.01); *G07F 9/002* (2020.05)

(58) Field of Classification Search
CPC ........ G07F 13/00; G07F 13/02; G07F 13/025; G07F 13/04; G07F 13/06; G07F 13/065; G07F 13/10
See application file for complete search history.

(56) References Cited

U.S. PATENT DOCUMENTS

| | | | | |
|---|---|---|---|---|
| 2,558,522 A | * | 6/1951 | Knapp | G07F 13/065 |
| | | | | 222/2 |
| 9,826,755 B1 | * | 11/2017 | Hsu | A23G 9/283 |
| 10,239,742 B2 | * | 3/2019 | Dresser | B67D 1/0888 |
| 2017/0293983 A1 | * | 10/2017 | Long, II | G06Q 20/18 |

FOREIGN PATENT DOCUMENTS

| | | | | | |
|---|---|---|---|---|---|
| CN | 101061826 A | * | 10/2007 | | G07F 13/02 |
| CN | 101111870 A | * | 1/2008 | | B01F 15/00318 |
| CN | 106683278 A | * | 5/2017 | | |
| WO | WO-2007090165 A2 | * | 8/2007 | | A23G 9/228 |

OTHER PUBLICATIONS

English abstract of CN106683278A (Year: 2017).*

* cited by examiner

*Primary Examiner* — Charlie Y Peng

(57) ABSTRACT

An automated processing system for making beverage comprises: an operation space, including a plurality of operation areas; a plurality of multi-shaft mechanical arm devices, at least including a driving device and a clamping device, respectively, wherein the driving device is used for driving the multi-shaft mechanical arm device to position the clamping device within an operation range; and a control panel, electrically connected to the multi-shaft mechanical arm device for controlling the multi-shaft mechanical arm devices to position the clamping device of one of the multi-shaft mechanical arm devices to the operation areas with respect to a preset order. Accordingly, the beverage can be made with a fully automated process and advantages of rapidly making the beverage, conveniently managing with the fully automated design and effectively saving the labor cost can be achieved.

6 Claims, 2 Drawing Sheets

AUTOMATED PROCESSING SYSTEM FOR MAKING BEVERAGE

BACKGROUND OF THE INVENTION

1. Field of the Invention

The present invention relates to an automated processing system for making beverage, especially to an automated processing system for making beverage having advantages of rapidly making beverages and saving labor cost.

2. Description of Related Art

Beverages have been the must have foods, for example a convenient store being provided with various kind of beverages stored in cooling cabinets, and customers can buy the beverages at any desired time; however, if a customer wants to have a fresh beverage, the beverage has to be freshly brewed and made, that is why a hand-shaking beverage in the commercial market is one of the most popular beverages.

At present, according to the current beverage marketing mode, the customer can decide the sweetness (no sugar, little sugars or normal sweetness) and the amount of ices (no ice, little ices or normal amount) contained in the beverage, so that the corresponding amounts of sugars and ices are added in the beverage, then a manual or a mechanical shaking process is performed for the purpose of well shaking and mixing the beverage ingredients, and finally the beverage ordered by the customer is sealed by a sealing machine.

With the above-mentioned means, the beverage may have different tastes due to the manual operation, and the favor could not be the same at every single time; moreover, a beverage store would assign personnel according to different processing procedures, for example, in a low season, the labor cost is unnecessarily increased due to too many personnel in the store and some personnel may even have nothing to do but just hanging around, and in a high season, some or even a lot of mistakes may occur because the personnel is not well assigned to an optimal status, thus the business may not be as good as anticipated; as such, the labor cost management is the most difficult issue for the beverage store.

Accordingly, how to improve problems of the beverage having different tastes due to the manual operation and the labor cost management being difficult shall be seriously concerned by the skilled people in the art.

In view of the above-mentioned disadvantages and problems, the applicant of the present invention provides an automated processing system for making beverage for improving the disadvantages and problems existed in the prior art so as to be more practical while being applied in the beverage market.

SUMMARY OF THE INVENTION

In view of the disadvantages and problems existed in the prior art, the present invention provides an automated processing system for making beverage which has the patentability of novel, non-obviousness and applicable in industrial use, thereby overcoming the above-mentioned disadvantages and problems existed in the prior art.

For achieving the above-mentioned objective, one technical solution provided by the present invention is to provide an automated processing system for making beverage, which comprises: an operation space, including a plurality of operation areas, wherein the operation areas at least include a cup placing area, a quantified material outputting area, a stirring area, a cup sealing area and a cleaning area; a plurality of multi-shaft mechanical arm devices, at least including a driving device and a clamping device, respectively, wherein the driving device is a rotation shaft motor which is used for driving the multi-shaft mechanical arm device to position the clamping device within an operation range, and the cup placing area, the quantified material outputting area, the stirring area, the cup sealing area and the cleaning area are arranged within the operation ranges of the multi-shaft mechanical arm devices; and a control panel, electrically connected to the multi-shaft mechanical arm device for controlling the multi-shaft mechanical arm devices to position the clamping device of one of the multi-shaft mechanical arm devices to the operation areas with respect to a preset order.

Wherein, the control panel can be used for controlling the multi-shaft mechanical arm device to clamp a stirring cup in the cup placing area, then the stirring cup is moved to the quantified material outputting area, so that a material filling device of the quantified material outputting area is able to fill the ingredient material of a certain beverage into the stirring cup. Then, the stirring cup is moved to the stirring area, and a stirring device of the stirring area is served to process a stirring operation. Then, the stirring cup is moved to the cup sealing area, the stirred beverage is poured into an un-sealed beverage cup, and the beverage cup is sealed by utilizing a cup sealing machine. Lastly, the empty stirring cup is moved to the cleaning area for being processed with a cleaning operation.

According to the automated processing system for making beverage provided by the present invention, the multi-shaft mechanical arm device is served to position the clamping device to the plural operation areas within the operation range, so that the beverage can be made with a fully automated process; with the automated processing system and method for making beverage provided by the present invention, advantages of rapidly making a beverage, conveniently managing with the fully automated design and effectively saving the labor cost can be achieved; moreover, with the automated mechanism, it can be ensured that the customer can have the beverage with the same quality, the same beverage amount and the same ingredient ratio of the beverage, so that errors caused by the manual operation which affect the ingredient ratio and the final taste and favor can be avoided; accordingly, the automated processing system for making beverage provided by the present invention is novel and more practical in use comparing to prior art.

BRIEF DESCRIPTION OF THE DRAWINGS

The present invention will be apparent to those skilled in the art by reading the following detailed description of a preferred embodiment thereof, with reference to the attached drawings, in which.

Figure 1:
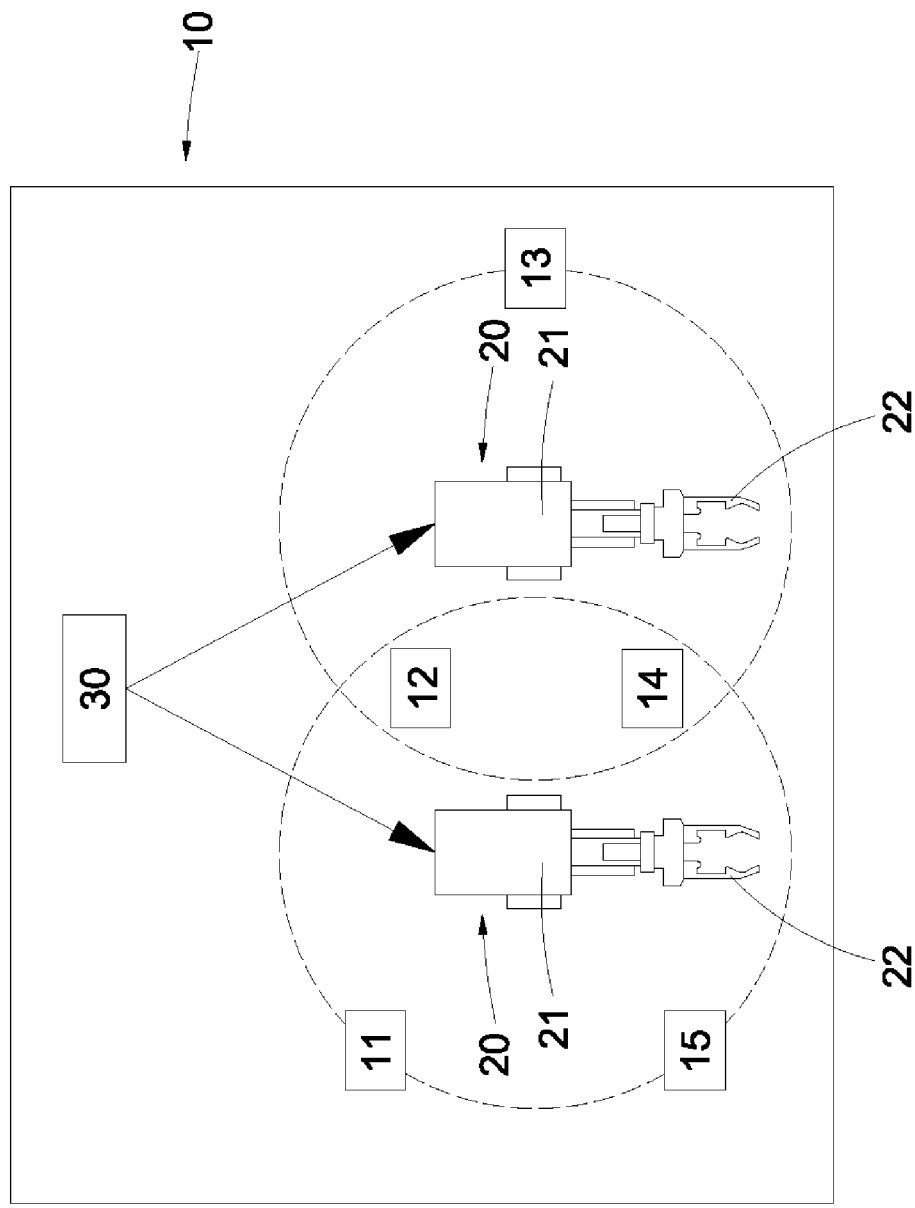
FIG. 1 is a schematic view showing the components arrangement of the automated processing system for making beverage according to one embodiment of the present invention.

DESCRIPTION OF CODES (10), (10A): Operation space
(11), (11A): Cup placing area (12), (12A): Quantified material outputting area
(13), (13A): Stirring area
(14), (14A): Cup sealing area
(15), (15A): Cleaning area
(20), (20A): Multi-shaft mechanical arm device
(21), (21A): Driving device
(22), (22A): Clamping device
(30), (30A): Control panel
(90): Stirring cup conveying device
(91): Conveying belt
(92): Cup holder

DETAILED DESCRIPTION OF THE
PREFERRED EMBODIMENT

Preferred embodiments of the present invention will be described with reference to the drawings. But what shall be addressed is that the drawings are served to provide a clear illustration, the scope and ratio thereof in actual practice can be varied.

The advantages, the features and the achieved technical means of the present invention are illustrated with the figures for providing a detailed disclosure which can be more easily to be understood, and the present invention can be practiced with altered embodiments, which are not limited to the provided embodiments; on the other hands, the skilled people in the art are able to fully understand the features of the present invention with the detailed disclosures, and the present invention is defined within the claims claimed by the present invention.

Unless having other definitions, the terms (including technical and scientific terms) and the proper nouns disclosed in the present invention shall be substantially understood as the same meanings which the skilled people in the art can comprehend, for example the terms listed in a dictionary shall be understood as the same meanings in the relevant fields; and unless the terms being obviously and alternatively defined hereinafter, the terms shall not be over-ideally or over-formally interpreted.

Please refer to FIG. 1, the present invention provides an automated processing system for making beverage, which comprises: an operation space (10), a plurality of multi-shaft mechanical arm devices (20) and a control panel (30).

The operation space (10) further includes a plurality of operation areas, and the plural operation areas at least include a cup placing area (11), a quantified material outputting area (12), a stirring area (13), a cup sealing area (14) and a cleaning area (15).

The plural multi-shaft mechanical arm devices (20) at least include a driving device (21) and a clamping device (22), respectively. The driving device (21) is a rotation shaft motor which is used for driving the multi-shaft mechanical arm device (20) to position the clamping device (22) within an operation range (marked as dashed lines in figures), and the cup placing area (11), the quantified material outputting area (12), the stirring area (13), the cup sealing area (14) and the cleaning area (15) are arranged within the operation ranges of the multi-shaft mechanical arm devices (20).

The control panel (30) is electrically connected to the multi-shaft mechanical arm device (20) for controlling the multi-shaft mechanical arm devices (20) to position the clamping device (22) of one of the multi-shaft mechanical arm devices (20) to the operation areas with respect to a preset order; according to this embodiment, the control panel (30) is disposed on a user operation interface (not shown in figures), and the user operation interface is a multiplex payment system.

Wherein, the control panel (30) can be used for controlling the multi-shaft mechanical arm device (20) to clamp a stirring cup in the cup placing area (11), then the stirring cup is moved to the quantified material outputting area (12), so that a material filling device of the quantified material outputting area (12) is able to fill the ingredient material of a certain beverage. Then, the stirring cup is moved to the stirring area (13), and a stirring device of the stirring area (13) is served to process a stirring operation. Then, the stirring cup is moved to the cup sealing area (14), the stirred beverage is poured into an un-sealed beverage cup, and the beverage cup is sealed by utilizing a cup sealing machine. Lastly, the empty stirring cup is moved to the cleaning area (15) for being processed with a cleaning operation.

When the automated processing system for making beverage provided by the present invention is desired to be used, firstly a user operates the user operation interface for choosing a beverage which is desired to be bought by a customer, after the user finishes the choosing operation, the control panel (30) is driven for enabling the multi-shaft mechanical arm device (20) to position the clamping device (22) within the operation range so as to finish sequential operations of filling the beverage in the stirring cup, stirring, pouring into the beverage cup, sealing the beverage cup, and cleaning the stirring cup.

Figure 2:
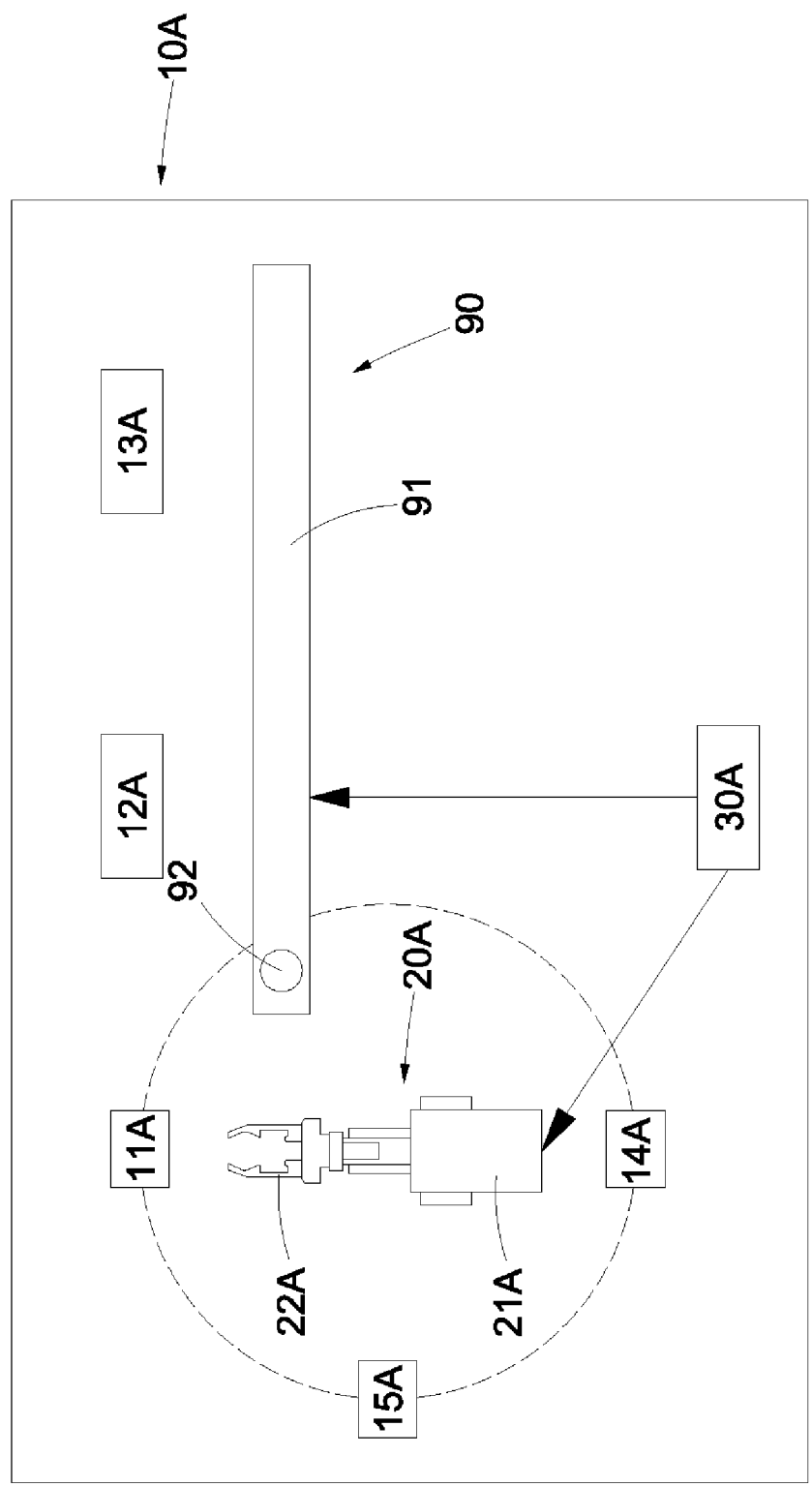
FIG. 2 is a schematic view showing the components arrangement of the automated processing system for making beverage according to an altered embodiment of the present invention.

Please refer to FIG. 2, which is a schematic view showing the automated processing system for making beverage according to an altered embodiment of the present invention. According to this embodiment, the automated processing system for making beverage comprises: an operation space (10A), a multi-shaft mechanical arm device (20A), a stirring cup conveying device (90) and a control panel (30A).

The operation space (10A) further includes a plurality of operation areas, and the plural operation areas at least include an cup placing area (11A), a quantified material outputting area (12A), a stirring area (13A), a cup sealing area (14A) and a cleaning area (15A).

The multi-shaft mechanical arm device (20A) at least includes a driving device (21A) and a clamping device (22A). The driving device (21A) is a rotation shaft motor which is used for driving the multi-shaft mechanical arm device (20A) to position the clamping device (22A) within an operation range (marked as dashed lines in figures), and the cup placing area (11A), the cup sealing area (14A) and the cleaning area (15A) are arranged within the operation range of the multi-shaft mechanical arm device (20A).

The stirring cup conveying device (90) includes a conveying belt (91) and a cup holder (92), wherein the cup holder (92) is fastened on the conveying belt (91), and the cup holder (92) is arranged within the operation range of the multi-shaft mechanical arm device (20A), so that the conveying belt (91) can be used for conveying the cup holder (92) to the quantified material outputting area (12A) and the stirring area (13A).

The control panel (30A) is electrically connected to the multi-shaft mechanical arm device (20A) and the stirring cup conveying device (90); according to this embodiment, the control panel (30A) is disposed on a user operation interface (not shown in figures), and the user operation interface is a multiplex payment system, for example a cash register or other payment interfaces.

Wherein, the control panel (30A) can be used for controlling the multi-shaft mechanical arm device (20A) to clamp a stirring cup in the cup placing area (11A), then the stirring cup is moved to the cup holder (92), and the conveying belt (91) is driven to convey the cup holder (92) to the quantified material outputting area (12A), so that a material filling device of the quantified material outputting area (12A) is able to fill the ingredient material of a certain beverage into the stirring cup. Then, the stirring cup is moved to the stirring area (13A), and a stirring device of the stirring area (13A) is served to process a stirring operation. Then, the stirring cup is moved to the original position, then the multi-shaft mechanical arm device (20A) is driven again for enabling the stirring cup, which has already been stirred, to be moved to the cup sealing area (14A), the beverage is poured into an un-sealed beverage cup, and the beverage cup is sealed by utilizing a cup sealing machine. Lastly, the empty stirring cup is moved to the cleaning area (15A) for being processed with a cleaning operation.

According to the automated processing system for making beverage provided by the present invention, the multi-shaft mechanical arm device is served to position the clamping device to the plural operation areas within the operation range, so that the beverage can be made with a fully automated process; with the automated processing system and method for making beverage provided by the present invention, advantages of rapidly making a beverage, conveniently managing with the fully automated design and effectively saving the labor cost can be achieved.

Moreover, with the automated mechanism, it can be ensured that the customer can have the beverage with the same quality, the same beverage amount and the same ingredient ratio of the beverage, so that errors caused by the manual operation which affect the ingredient ratio and the final taste and favor can be avoided. Accordingly, the automated processing system for making beverage provided by the present invention is novel and more practical in use comparing to prior art.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. An automated processing system for making beverage, comprising:
    an operation space, including a plurality of operation areas, wherein the operation areas at least include a cup placing area, a quantified material outputting area, a stirring area, a cup sealing area and a cleaning area;
    a plurality of multi-shaft mechanical arm devices, at least including a driving device and a clamping device, respectively, wherein the driving device is a rotation shaft motor which is used for driving the multi-shaft mechanical arm device to position the clamping device within an operation range, and the cup placing area, the quantified material outputting area, the stirring area, the cup sealing area and the cleaning area are arranged within the operation ranges of the multi-shaft mechanical arm devices; and
    a control panel, electrically connected to the multi-shaft mechanical arm device for controlling the multi-shaft mechanical arm devices to position the clamping device of one of the multi-shaft mechanical arm devices to the operation areas with respect to a preset order;
    wherein the control panel is used for controlling the multi-shaft mechanical arm device to clamp a stirring cup in the cup placing area, then the stirring cup is moved to the quantified material outputting area, so that a material filling device of the quantified material outputting area is able to fill an ingredient material of a certain beverage into the stirring cup; then, the stirring cup is moved to the stirring area, and a stirring device of the stirring area is served to process a stirring operation; then, the stirring cup is moved to the cup sealing area, the stirred beverage is poured into an un-sealed beverage cup, and the beverage cup is sealed by utilizing a cup sealing machine; and lastly, the empty stirring cup is moved to the cleaning area for being processed with a cleaning operation.

2. The automated processing system for making beverage as claimed in claim 1, wherein the control panel is disposed on a user operation interface.

3. The automated processing system for making beverage as claimed in claim 2, wherein the user operation interface is a multiplex payment system.

4. An automated processing system for making beverage, comprising:
    an operation space, including a plurality of operation areas, wherein the operation areas at least include a cup placing area, a quantified material outputting area, a stirring area, a cup sealing area and a cleaning area;
    a multi-shaft mechanical arm device, including a driving device and a clamping device, wherein the driving device is a rotation shaft motor which is used for driving the multi-shaft mechanical arm device to position the clamping device within an operation range, and the cup placing area, the cup sealing area and the cleaning area are arranged within the operation range of the multi-shaft mechanical arm device;
    a stirring cup conveying device, including a conveying belt and a cup holder, wherein the cup holder is fastened on the conveying belt, and the cup holder is arranged within the operation range of the multi-shaft mechanical arm device, so that the conveying belt is able to be used for conveying the cup holder to the quantified material outputting area and the stirring area; and
    a control panel, electrically connected to the multi-shaft mechanical arm device and the stirring cup conveying device;
    wherein the control panel is used for controlling the multi-shaft mechanical arm device to clamp a stirring cup in the cup placing area, then the stirring cup is moved to the cup holder so as to be held, and the conveying belt is driven to convey the cup holder to the quantified material outputting area, so that a material filling device of the quantified material outputting area is able to fill an ingredient material of a certain beverage into the stirring cup; then, the stirring cup is moved to the stirring area, and a stirring device of the stirring area is served to process a stirring operation; then, the conveying belt is served to convey the stirring cup to an original position of the cup holder, then the multi-shaft mechanical arm device is driven again for enabling the stirring cup to be moved to the cup sealing area, the beverage is poured into an un-sealed beverage cup, and the beverage cup is sealed by utilizing a cup sealing machine; and lastly, the empty stirring cup is moved to the cleaning area for being processed with a cleaning operation.

5. The automated processing system for making beverage as claimed in claim 4, wherein the control panel is disposed on a user operation interface.

6. The automated processing system for making beverage as claimed in claim 5, wherein the user operation interface is a multiplex payment system.

* * * * *